United States Patent [19]
Hall et al.

[11] Patent Number: 6,106,419
[45] Date of Patent: Aug. 22, 2000

[54] BALL AND A METHOD OF MANUFACTURING A BALL

[75] Inventors: Bengt Hall, Portlaoise; Michael Friel, Kildare Town, both of Ireland

[73] Assignee: Tretorn Research and Development Limited, Portlaoise, Ireland

[21] Appl. No.: 09/068,199

[22] PCT Filed: Nov. 8, 1996

[86] PCT No.: PCT/SE96/01435

§ 371 Date: Sep. 2, 1998

§ 102(e) Date: Sep. 2, 1998

[87] PCT Pub. No.: WO97/17109

PCT Pub. Date: May 15, 1997

[30] Foreign Application Priority Data

Nov. 10, 1995 [IE] Ireland ..................................... 950865

[51] Int. Cl.$^7$ .................................................. A63B 39/00
[52] U.S. Cl. ........................................... 473/604; 473/594
[58] Field of Search .................................... 473/569, 593, 473/594, 595, 600, 601, 602, 603, 604, 606

[56] References Cited

U.S. PATENT DOCUMENTS

| | | | |
|---|---|---|---|
| 1,803,121 | 4/1931 | Meurisse | 473/601 |
| 2,815,211 | 12/1957 | Grandinette | 473/598 |
| 2,819,753 | 1/1958 | Nogue | 473/604 |
| 4,085,937 | 4/1978 | Schenk . | |
| 4,249,730 | 2/1981 | Frisk . | |
| 4,318,875 | 3/1982 | Shrimpton et al. | 473/604 |
| 4,952,190 | 8/1990 | Tarnoff et al. | 473/594 |
| 5,026,054 | 6/1991 | Osher et al. | 473/594 |
| 5,558,325 | 9/1996 | Hargis et al. | 473/606 |

FOREIGN PATENT DOCUMENTS

| | | |
|---|---|---|
| 0559254 | 5/1993 | European Pat. Off. . |
| 0646396 | 2/1994 | European Pat. Off. . |
| 2001538 | 7/1978 | United Kingdom . |

*Primary Examiner*—Steven Wong
*Attorney, Agent, or Firm*—Browdy and Neimark

[57] ABSTRACT

A ball has a wall of elastomeric material defining a cavity. The cavity contains a filling which comprises a plurality of substantially closed cells. The pressure in the cavity is substantially atmospheric pressure. The substantially closed cells fill a peripheral part of the cavity adjoining the inner side of the wall, or the cavity is substantially filled with the substantially closed cells. The substantially closed cells have elastomeric walls. At least some of the substantially closed cells are separate hollow bodies. The hollow bodies are microspheres.

26 Claims, No Drawings

BALL AND A METHOD OF MANUFACTURING A BALL

The present invention relates to a ball for use in playing games, especially to a pressureless ball, such as a pressureless tennis ball.

Conventional tennis balls as well as many other balls for playing games, have a wall or shell of elastomeric material which is usually a composition of rubber or rubber-like materials. The wall forms a hollow sphere or core defining a cavity which is filled with gas, usually air, at a required pressure.

In case the cavity contains a gas at a pressure above that of the atmosphere, the ball is called a pressurized ball. In case the cavity contains a gas having substantially the same pressure as that of the atmosphere, the ball is called a pressureless ball.

Both the above types of tennis balls can be made to meet the requirements of the International Lawn Tennis Federation as regards diameter, weight, rebound and deformation. In addition to meeting these requirements, a tennis ball should have a long life as well as good and consistent play behaviour.

Pressurized balls have a relatively short life as a result of the gas permeating through the wall of rubber or rubber-like materials. On the other hand, pressureless balls have a substantially longer life but are difficult to produce with the desired play behaviour.

There is therefore a need for an improved ball, especially a tennis ball, which will address these problems.

According to the invention, there is provided a ball having a wall of elastomeric material defining a cavity that contains a filling which comprises a plurality of substantially closed cells.

By introducing such a filling in the cavity of the ball, the deformation behaviour, and especially the dynamic deformation behaviour of the ball may be controlled, such that the play behaviour of the ball may be easily determined as desired.

It should be noted that the deformation behaviour of a pressurized ball to a large extent depends on the pressurized gas in the cavity, while the deformation behaviour of a conventional pressureless ball is mainly due to the characteristics of the elastomeric material forming the wall of the ball.

Thus, the force needed to compress the pressurized ball increases continuously, with increasing compression, along a curve primarily determined by the elevated pressure in the cavity of the ball and increasing progressively. In the conventional pressureless ball, the compression force follows an increasing curve which is more complex as a consequence of the major influence of the characteristics of the material of the elastomeric wall which also control the rebound of the ball.

By being able to modify both the characteristics of the elastomeric material forming the wall of the ball, and the characteristics of the filling comprising closed cells, the compression behaviour and, consequently, the play behaviour of the ball, especially the pressureless tennis ball, may easily be adapted to various requirements.

Preferably, the cavity is substantially filled with the substantially closed cells in order that the compression behaviour shall be affected. However, it is possible to let the substantially closed cells fill only a peripheral part of the cavity adjoining the inner side while some other material is used in the central part thereof, and still obtain a desired compression behaviour.

In a preferred embodiment, the substantially closed cells are elastomeric in order to be able to adapt to the changing shape of the cavity during compression of the ball, For the same reason, the substantially closed cells can be separate hollow bodies which may move relative to each other during the change of shape of the cavity of the ball.

Of course, neither do all the closed cells need to be separate hollow bodies nor do all the hollow bodies need to be separate.

Microspheres, especially polymeric microspheres are a preferred form of hollow bodies. They have the preferred elasticity and may be used in unexpanded as well as in expanded form. Further, microspheres have a low weight, such that they do not adversely affect the weight of the ball. In addition, such microspheres form an essentially leak-proof filling for the cavity of the ball.

Preferably, the expanded polymeric microspheres have a particle size in the range of from 15 $\mu$m to 150 $\mu$m, and more preferably from 30 $\mu$m to 100 $\mu$m. In a preferred arrangement, the filling has a weight of from 0.5 g to 4.0 g, preferably from 1.0 g to 3.0 g. Useful microspheres are available under the tradesname EXPANCEL from Akzo Nobel, Sweden.

For ease of filling, preferably the microspheres are formed from an expandable material which may, for example, be provided in the form of a pellet or tablet of unexpanded material which is subsequently expanded in situ to substantially fill the cavity with expanded microspheres.

In one embodiment of the invention, the unexpanded material is formed into a preform such as a pellet or tablet, inserted into the cavity and subsequently expanded to form the filling of microspheres.

The polymeric material may include a compatible binder material which may be selected from one or more of ethyl vinyl acetate and paraffin wax. The binder material facilitates the forming of a preform of the unexpanded material.

The invention also provides a method for manufacturing a ball having a cavity by forming a spherical shell of an elastomeric material and providing a filling in the cavity, said filling comprising a plurality of substantially closed cells, preferably microspheres.

The cavity may be filled with pre-expanded microspheres.

Alternatively, the filling is formed in situ in the cavity from unexpanded material. In this case, typically the unexpanded material is formed into a preform which is inserted into the cavity and subsequently converted in situ into polymeric microspheres. The preform may be a pellet or a tablet.

The microspheres may be polymeric microspheres. In one embodiment of the invention, the polymeric material includes a compatible binder such as ethyl vinyl acetate and/or paraffin wax.

In one arrangement, the method comprises the steps of:

inserting a preform of unexpanded material into at least one of a pair of hemispherical half shells;

bonding the two half shells together to form the cavity; and expanding the material to form a filling of microspheres which substantially fill the cavity.

Typically, the polymeric material is expanded by heat at a temperature from 80° C. to 140° C.

In an alternative arrangement, the method comprises the steps of:

inserting a volume of expanded material between two hemispherical half shells of elastomeric material; and bonding the two half shells together to form the cavity.

The step of inserting a volume of expanded material in between the two hemispherical half shells of elastomeric material may include first enclosing said volume of expanded material in a soft envelope. More precisely, unexpanded material may first be enclosed in a soft material and then expanded therein.

An embodiment of the invention, more specifically a tennis ball by way of example only, will be described in more detail such that the invention will be clearly understood.

A pressurized tennis ball initially has good playing properties but the playability diminishes due to gas escape. This problem of loss of playing properties has been addressed by the present invention by filling the cavity with low weight microspheres, in this case polymeric microspheres.

The polymeric microspheres used in the invention may be either pre-expanded or expanded in situ during the process of tennis ball manufacture. It has been found that the microspheres may be used in pure form or in combination with suitable polymeric binder materials.

The pre-expanded, unexpanded, polymer bound preexpanded and polymer bound unexpanded materials are all referred to as the filling in this specification.

The microspheres employed in the present invention are hollow thermoplastic particles having the following diameters: the pre-expanded microspheres have a particle size of 15–80 $\mu$m and unexpanded microspheres have a particle size of 6–24 $\mu$m. However, the expanded particles may have a particle size from 10 to 150 $\mu$m, preferably in the range from 30 $\mu$m to 100 $\mu$m.

The microspheres contain a volatile liquid. The amount of this liquid is usually 5 to 50% by weight of the microsphere. The volatile liquid is conventionally a hydrocarbon, such as isobutan. It will be appreciated that the volatile liquid should be selected such that it does not dissolve the thermoplastic material of the microspheres.

When microspheres are used in the pure form, 0.5 g–1.5 g is required to fill the core cavity. In the presence of a binder, the total weight of the matrix is between 1.0 g and 3.0 g. A polymeric binder has been found to be useful during the manufacturing process of tennis balls. Suitable binder materials include ethyl vinyl alcohol (EVA) having a melting point of 95° C., and paraffin wax having a melting point of 50–52° C. The microspheres are preferably mixed, in a separate process, with the polymeric binder material and formed into a preform such as pellets or tablets for simple dosing.

A number of modifications may be made to the ball in order to accommodate the filling. For example, a lighter felt and/or different core weights may be used.

To manufacture tennis balls, various elastomeric materials are mixed with different chemical ingredients. The mixture is milled to a smooth consistency and fed into an extruder which forms the mixture into preforms. The elastomeric preforms are placed into a multicavity precision mould. Under pressure and heat, the preforms are formed into hemispheres each of which is one half of a tennis ball core. These halves are edge ground. The edges are then coated with adhesive in a double-carousel assembly unit.

Pellets containing pure or matrix bound unexpanded microspheres are added to half shells on one carousel. The half shells meet, one from each of the carousel units, one containing a pellet and the other being empty.

The half shells adhesively tack together before entering a second sure process. This second cure permanently fuses the halves forming pressureless complete ball cores. The completed and resilient cores are conveyed to grinding machines which abrade the surface of the cores. A slightly rough surface permits a ball core to better retain adhesive and results in a good bond between ball and cover. Following grinding, the cores are coated with adhesive.

The covers for the ball cores are cut from felt. The back of the rolls of felt are coated with adhesive in controlled quantities prior to cutting cover pieces therefrom. The cover pieces are edge coated with adhesive which defines the seams of the tennis ball. From the cover operation, the tennis balls are moved to another press to undergo a third curing process. The application of heat and pressure in the third curing process assures a solid bond between cover and core. The time is also important both for the degree of cure and the degree of expansion of the microspheres. The microspheres should be fully expanded in this process and the cavity should be filled. The expansion temperatures range from 80° C. to 140° C.

Removed from the curing press, the balls are then steam fluffed to raise the nap of the felt and dried to form finished tennis balls.

The tennis ball described above complies with the International Lawn Tennis Federation specification and has play properties at least as good as conventional tennis balls.

It will be appreciated that while the invention has been described with reference to tennis balls, it may also be possible to apply it to other play balls having a wall of elastomeric material defining a cavity, e.g. footballs, volleyballs, basketballs and squashballs.

Also, it is to be understood that modifications to the above described embodiment of the invention can be made by the person skilled in the art without departing from the spirit and scope of the invention. For example, other materials than microspheres may be used as long as they possess substantially closed cells that can affect the compression behavior of the ball.

We claim:

1. In a tennis ball of tennis-ball size and meeting standards of the International Lawn Tennis Federation, comprising a self-supporting and shape retaining spherical wall formed of an elastomeric material defining a cavity therewithin and having felt nap exterior surface, the improvement wherein said cavity contains a filling which comprises a plurality of separate hollow bodies forming substantially closed cells having elastomeric walls.

2. A ball as claimed in claim 1, wherein the pressure in the cavity is substantially atmospheric pressure.

3. A ball as claimed in claim 1, wherein the separate hollow bodies fill only a peripheral part of the cavity adjoining the inner side of the wall.

4. A ball as claimed in claim 2, wherein the separate hollow bodies substantially fill the cavity.

5. A ball as claimed in claim 2, wherein the hollow bodies are microspheres.

6. A ball as claimed in claim 5, wherein the microspheres are polymeric microspheres.

7. A ball as claimed in claim 5, wherein the microspheres have a particle size in the range from 15 $\mu$m to 150 $\mu$m.

8. A ball as claimed in claim 7, wherein the microspheres have a particle size in the range from 30 $\mu$m to 100 $\mu$m.

9. A ball as claimed in claim 1, wherein the filling has a weight of from 0.5 g to 4.0 g.

10. A ball as claimed in claim 9, wherein the filling has a weight of from 1.0 g to 3.0 g.

11. A method of manufacturing a tennis ball having a cavity by forming a spherical shell of tennis ball size of an elastomeric material, characterized in that a filling comprising a plurality of separate hollow bodies forming substantially closed cells having elastomeric walls, is provided in the cavity, wherein the filling is given a volume substantially corresponding to the volume of the cavity, and wherein the filling comprises microspheres and a binder; and providing a felt cover with raised nap.

12. A method as claimed in claim 11, wherein the filling is formed in situ from an expandable material.

13. A method as claimed in claim 12, wherein the filling is formed from unexpanded microspheres.

14. A method as claimed in claim 12, wherein the expandable material is formed into a preform which is inserted into the cavity, the preform subsequently being expanded.

15. A method as claimed in claim 11, wherein the filling is formed from pre-expanded microspheres.

16. A method as claimed in claim 12, wherein a binder is added to the expandable material.

17. A method as claimed in claim 15, wherein the binder is selected from the group consisting of ethyl vinyl alcohol and paraffin wax.

18. A method as claimed in claim 14, comprising the steps of:

inserting a preform of unexpanded material into at least one of a pair of hemispherical half shells;

bonding the two half shells together to form the cavity; and expanding the material to form a filling of microspheres which substantially fill the cavity.

19. A method as claimed in claim 11, comprising the steps of:

inserting a volume of expanded material in between two hemispherical half shells of elastomeric material; and bonding the two half shells together to form the cavity.

20. A method as claimed in claim 19, wherein the step of inserting a volume of expanded material in between the two hemispherical half shells of elastomeric material includes first enclosing said volume of expanded material in a soft envelope.

21. A method as claimed in claim 20, wherein the step of inserting a volume of expanded material in between the two hemispherical half shells of elastomeric material includes first enclosing an unexpanded material in a soft envelope and then expanding the material therein.

22. The tennis ball of claim 1 wherein the separate hollow bodies are microspheres which substantially fill the cavity together with a polymeric binder.

23. The tennis ball of claim 22 wherein said microspheres have a particle size in the range of 30 $\mu$m to 100 $\mu$m and said filling has a weight of from 1.0 g to 3.0 g.

24. The tennis ball of claim 23 wherein said microspheres contain a volatile fluid in an amount of 5–50% by weight of the microspheres.

25. A playball consisting essentially of an outer wall of substantially fixed and stable shape which is momentarily deformable in use and which returns to its fixed and predetermined shape immediately following deformation thereof, said wall defining a cavity therewithin, and a filling within said cavity consisting essentially of a plurality of separate hollow bodies forming substantially closed cells having elastomeric walls, and optionally a polymeric binder between and among said separate hollow bodies, said separate hollow bides comprising microspheres having a particle size in the range of 15 $\mu$m to 150 $\mu$m.

26. The ball of claim 25 having a shape and size selected from the group consisting of the shape and size of a football, of a volley ball, of a basketball and of a squash ball.

* * * * *